US006885696B2

(12) United States Patent
Wingrove (10) Patent No.: US 6,885,696 B2
(45) Date of Patent: Apr. 26, 2005

(54) NOTIFYING BIT ALLOCATION CHANGES IN A MULTICARRIER MODULATION COMMUNICATIONS SYSTEM

(75) Inventor: Michael J. Wingrove, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 735 days.

(21) Appl. No.: 09/746,423

(22) Filed: Dec. 26, 2000

(65) Prior Publication Data
US 2002/0080824 A1 Jun. 27, 2002

Related U.S. Application Data

(60) Provisional application No. 60/221,521, filed on Jul. 28, 2000.

(51) Int. Cl.[7] .................................................. H04B 1/38
(52) U.S. Cl. ........................................ 375/219; 375/220
(58) Field of Search ................................. 375/219, 220, 375/221, 222, 356, 358, 260, 295, 316; 370/222, 208, 210, 204, 205, 509, 512; 455/73, 88, 551, 552, 560, 553, 78, 83

(56) References Cited

U.S. PATENT DOCUMENTS

| | | | |
|---|---|---|---|
| 5,400,322 A | | 3/1995 | Hunt et al. .................... 370/19 |
| 5,479,447 A | | 12/1995 | Chow et al. ................. 375/260 |
| 6,128,349 A | * | 10/2000 | Chow .......................... 375/260 |
| 6,134,283 A | * | 10/2000 | Sands et al. ................. 375/354 |
| 6,359,933 B1 | * | 3/2002 | Aslanis et al. .............. 375/260 |
| 6,408,033 B1 | * | 6/2002 | Chow et al. ................. 375/260 |
| 6,445,730 B1 | * | 9/2002 | Greszczuk et al. .......... 375/219 |
| 6,611,493 B1 | * | 8/2003 | Miyashita et al. ........... 370/208 |
| 2002/0150152 A1 | * | 10/2002 | Greszczuk et al. .......... 375/219 |

OTHER PUBLICATIONS

"The Essential Merit of Bit–Swapping", John M.Cioffi, Department of Electrical Engineering, Stanford University; (4 pages).
"Proposed working text for Seamless Rate Adaptation (SRA) for G.dmt.bis and G.lite.bis", Aware, Inc., ITU—Telecommunication Standardization Sector, Study Group 15, Temporary Document BA–087, Jun. 19–23, 2000 (6 pages).
"Semi–Stationary Q–Mode", Orckit Communications, ITU—Telecommunication Standardization Sector, Study Group 15, Temporary Document HC–029 (3 pages).
"G–gen: SRA features and messages", Alcatel, ITU–Telecommunication Standardization Sector, Study Group 15, Temporary Document HC–049, Jul. 31 –Aug. 4, 2000 (2 pages).
"G.gen: SRA and the inverted SYNC Symbol", M. Wingrove, Nortel Networks, ITU —Telecommunication Standardization Sector, Study Group 15, Temporary Deocument HC–071RI, Jul. 31 –Aug. 4, 2000 (2 pages).

* cited by examiner

Primary Examiner—Emmanuel Bayard (57) ABSTRACT

In a multicarrier modulation communications system, a change of a bit allocation table for the multiple subchannels or tones is notified from a transmitter to a receiver by a change in the inversion state of synchronization symbols provided in superframes of transmitted multicarrier symbols, successive changes of the bit allocation table being indicated by opposite changes of the inversion state of the synchronization symbols, respectively from non-inverted to inverted synchronization symbols and from inverted to non-inverted synchronization symbols. This provides resistance to errors and facilitates rapid recovery in the event that errors occur. A superframe number can also be used to identify when the inversion state of the synchronization symbols is to be changed.

14 Claims, 3 Drawing Sheets

NOTIFYING BIT ALLOCATION CHANGES IN A MULTICARRIER MODULATION COMMUNICATIONS SYSTEM

This application claims the benefit of U.S. Provisional Application No. 60/221,521 filed Jul. 28, 2000, the entire contents and disclosure of which are hereby incorporated herein by reference.

This invention relates to notifying bit allocation changes in a multicarrier modulation communications system.

BACKGROUND OF THE INVENTION

So-called ADSL (asymmetric digital subscriber line) communications systems are known in the form of multi-carrier modulation (MCM) communications systems which are conveniently implemented as discrete multitone (DMT) systems using Discrete Fourier Transform (DFT) and inverse DFT (IDFT) techniques. American National Standard for Telecommunications document T1.413 describes a particular form of such an ADSL system, and the invention is accordingly described below in the context of such an ADSL system. However, it can be appreciated that the invention is applicable to other forms of MCM communications systems, whether or not they are DMT systems and whether or not they provide asymmetric communications.

A T1.413 ADSL system uses a superframe structure in which each superframe is composed of 68 data frames, numbered 0 to 67, which are encoded and modulated into DMT symbols, followed by a synchronization symbol (also referred to as a synchronization frame), which is inserted by the modulator to establish superframe boundaries. From a user data perspective the DMT symbol period is 0.25 ms corresponding to a DMT symbol rate of 4000 symbols per second, but in order to allow for the insertion of the synchronization symbol the transmitted DMT symbol rate is increased by a factor of 69/68; the superframe period is 17 ms.

In each data frame, buffered data is allocated to the different tone or carrier subchannels in a manner which is dependent upon the signal-to-noise ratios (SNRs) of the subchannels, typically so that bit error rates (BERs) of the subchannels, as monitored at the receiver, are substantially equal. As a result, within each data frame different subchannels carry different numbers of bits. With an appropriate allocation of bits and transmit powers to the different subchannels, such a system can provide a desirable performance.

Over a period of time during normal operation of such an ADSL system, for example with changes in temperature, traffic on adjacent transmission channels, and other sources of interference, the SNRs of the different subchannels will vary, so that it is desirable to update the allocations of bits to subchannels during operation of the system. Peter S. Chow et al. U.S. Pat. No. 5,479,447 issued Dec. 26, 1995, entitled "Method And Apparatus For Adaptive, Variable Bandwidth, High-Speed Data Transmission Of A Multicarrier Signal Over Digital Subscriber Lines", discloses a procedure for initializing bit allocations in an MCM system, and proposes an adaptive updating procedure for such allocations.

It can be appreciated that the bit allocations which are used by the transmitter and the receiver must be matched, and that changes of these bit allocations must be made at the same time (i.e. for the same superframe) in the transmitter and the receiver in a manner which is not subject to errors. Otherwise, the BER can be seriously impaired, and there may be a resulting need to fully re-initialize the system: a very undesirable consequence, especially considering the time (of the order of 10 seconds) required for full initialization.

To avoid errors in the bit allocation updating procedure, referred to briefly as bit swapping but more accurately relating to an updating of bit allocations and signal energies, or transmit gains, in what is referred to as a B&G (bits and gains) table maintained in each of the transmitter and the receiver) bit swap request messages can be sent from the receiver to the transmitter using an ADSL overhead control channel (referred to as the aoc) which is part of the ADSL framing structure. Each aoc message is transmitted 5 consecutive times, to provide a high degree of reliability, and the message can also be subject to forward error correction coding (FECC), codeword interleaving, and trellis coding of the system. In response to the bit swap message, the transmitter can send an acknowledge message on the aoc, and the bit allocation is subsequently performed at both the transmitter and the receiver.

Ronald R. Hunt et al. U.S. Pat. No. 5,400,322 issued Mar. 21, 1995, entitled "Updating Of Bit Allocations In A Multicarrier Modulation Transmission System", discloses such a so-called bit swapping procedure, together with a numbering of DMT symbols for synchronizing bit allocation changes between the transmitter and receiver of an ADSL system. In addition, this patent recognizes that because the subchannels carry variable numbers of bits, the total transmission rate of the system is not fixed but can be increased (resulting in reduced SNR) or decreased (resulting in increased SNR) to meet particular requirements.

Such variation in transmission rate, now referred to as seamless rate adaptation (SRA), serves to adapt the data transmission rate during operation of the ADSL system in a so-called seamless manner, i.e. without errors in or interruption of the data transmission. As can be appreciated from the above description, SRA involves changing the number of bits modulated in a DMT symbol (i.e. one data frame), and changing the B&G tables accordingly, without modifying other parameters of the ADSL system such as the FECC, interleaving, and framing. It can be appreciated that error-free changes to the B&G tables in a manner that is synchronized between the transmitter and the receiver is as important for SRA as it is for conventional bit swapping, for similar reasons.

Whereas conventional bit swapping is initiated by the receiver, SRA can be initiated by either the receiver or the transmitter. In the former case the receiver sends an SRA request message to the transmitter, and in the latter case the transmitter sends an initial SRA request message to the receiver which can accept this request by sending an SRA request message to the transmitter. In each case the transmitter can grant the request by sending a signal referred to as SRA_GO to the receiver, after which the transmitter and receiver both use changed B&G tables accordingly.

In either conventional bit swapping or SRA, there remains a risk of errors causing a loss of synchronism between the B&G tables used in the transmitter and the receiver. For example, the acknowledge message or SRA_GO signal may be transmitted by the transmitter but may become corrupted due to a burst of errors and not recognized by the receiver. In this case, the transmitter will switch to a changed B&G table but the receiver will not, resulting in such a loss of synchronism.

In order to address such a problem, "The Essential Merit Of Bit-Swapping" by John M. Cioffi suggests that after transmitting a bit swap request message the receiver can monitor the incoming signal from the transmitter using both old and new B&G tables, and can use an FECC error flag to determine which of the tables is correct and should continue to be used. This proposal would be relatively inconvenient and costly to implement, because the FECC operates on data bytes rather than on the subchannels or tones and their allocated bits so that translation between these would be necessary, and is further complicated by interleaving.

It has been proposed in "Proposed working text for Seamless Rate Adaptation (SRA) for G.dmt.bis and G.lite.bis", Aware, Inc., ITU—Telecommunication Standardization Sector, Study Group 15, Temporary Document BA-087, 19–23 Jun. 2000, to implement the SRA GO signal as an inverted synchronization symbol (180 degree phase shift). It will be recalled from the description above that the synchronization symbol, which comprises a known pseudo-random data sequence or pattern, is inserted after every 68 data frames (DMT symbols) to establish superframe boundaries.

It is observed here that during initialization of a T1.413 ADSL system, various signals are used including signals which can be generically referred to as REVERB and SEGUE. The REVERB signals use the same pseudo-random data pattern as is used by the synchronization symbols. Except for a pilot tone, the SEGUE signals comprise a tone-by-tone 180 degree phase reversal of the REVERB signals (i.e. +maps to −, and −maps to +, for each signal point of the 4-QAM constellation that is used). The pilot tone is a specific subchannel or tone onto which the data modulated is a constant {0,0}, generating the {+,+} 4-QAM constellation point, used to facilitate resolution of sample timing. Thus except for this pilot tone, the SEGUE signal is an inversion of the REVERB signal, corresponding to the synchronization symbol. As used herein inversion of the synchronization symbol includes such a tone-by-tone 180 degree phase reversal for all or substantially all of the tones, whether or not this includes a 180 degree phase reversal for any specific tones used for special purposes, such as the pilot tone. Terms such as inversion and inverted as used herein are to be understood accordingly.

However, it has been recognized that with the above proposal a burst of noise might conceivably cause a normal synchronization symbol to be interpreted as an inverted synchronization symbol, in which case the receiver could prematurely implement a change in its B&G table. To reduce this risk, it has been proposed in "G.gen: SRA features and messages", Alcatel, ITU—Telecommunication Standardization Sector, Study Group 15, Temporary Document HC-049, 31 Jul.–4, Aug. 2000, to send a superframe count with the SWA swap request message to identify where the SRA_GO signal is expected, and for the receiver to monitor only the particular expected synchronization symbol for inversion to constitute the SRA_GO signal. Even in this case, there is a possibility that the actually inverted synchronization symbol constituting the SRA_GO signal may be corrupted by noise so that it is wrongly interpreted as a non-inverted synchronization symbol, in which case again the transmitter would implement the relevant SRA changes and the receiver would not.

In the various error situations discussed above, recovery techniques can be used for example as described by John M. Cioffi as discussed above, or re-initialization or retraining of the system, but these techniques are not particularly desirable because of their adverse impacts on the architecture and complexity of the system and/or data transmission.

A need exists, therefore, to provide an improved method of notifying a receiver of bit allocation changes in a multicarrier modulation communications system.

SUMMARY OF THE INVENTION

According to one aspect, this invention provides a method of notifying a receiver of a bit allocation change in a multicarrier modulation communications system in which data frames and synchronization frames are transmitted in superframes from a transmitter to the receiver, comprising the steps of: at the transmitter, changing an inversion state of successive synchronization frames to notify the receiver of a bit allocation change; and at the receiver, detecting a change in inversion state of received synchronization frames to determine the bit allocation change.

The invention also provides a transmitter for a multicarrier modulation communications system for use in carrying out the method recited above, the transmitter comprising: information for allocating data bits to multicarrier subchannels for transmission in respective data frames; a control unit for controlling transmission of the data frames in superframes each including a synchronization frame; and means for changing an inversion state of the synchronization frames to indicate a change of said information, successive changes of said information being indicated by opposite changes of the inversion state of the synchronization frames, respectively from non-inverted to inverted synchronization frames and from inverted to non-inverted synchronization frames.

The invention further provides a receiver for a multicarrier modulation communications system for use in carrying out the method recited above, the receiver comprising: information for decoding received multicarrier subchannel data frames to data bits in accordance with bit allocations, the data frames being received in superframes each including a synchronization frame; and a control unit for detecting a change of an inversion state of successive synchronization frames and changing said bit allocations in response to such detection, successive changes of said bit allocations being effected in response to detection of opposite changes of the inversion state of the synchronization frames, respectively from non-inverted to inverted synchronization frames and from inverted to non-inverted synchronization frames.

According to another aspect, this invention provides a method of notifying a receiver of bit allocation changes in a DMT (discrete multitone) communications system in which information is transmitted from a transmitter to the receiver in superframes each of which comprises a plurality of DMT data symbols and a synchronization symbol, comprising the steps of: at the transmitter, changing an inversion state of the synchronization symbols, from non-inverted to inverted and from inverted to non-inverted, to notify the receiver of successive bit allocation changes; and at the receiver, detecting changes in the inversion state of received synchronization symbols, from non-inverted to inverted and from inverted to non-inverted, to determine the successive bit allocation changes.

The invention further provides a transmitter for a DMT (discrete multitone) communications system for use in carrying out the above method, the transmitter comprising: a bit allocation table in accordance with which data bits are allocated to tones for transmission in respective DMT symbols; a control unit for controlling transmission of the DMT symbols in superframes each including a synchronization symbol; and means for changing an inversion state of the synchronization symbols to indicate a change of the bit allocation table, successive changes of the bit allocation table being indicated by opposite changes of the inversion state of the synchronization symbols, respectively from non-inverted to inverted synchronization symbols and from inverted to non-inverted synchronization symbols.

The means for changing an inversion state of the synchronization symbols to indicate a change of the bit allocation table can comprise means for changing a sign of inputs to or outputs from an IDFT (Inverse Discrete Fourier Transform) of the transmitter.

Alternatively, the means for changing an inversion state of the synchronization symbols to indicate a change of the bit allocation table can comprise means for selectively inverting an output of a pseudo random data source in accordance with which tones of the synchronization symbols are modulated.

The invention also provides a receiver for a DMT (discrete multitone) communications system for use in carrying out the above method, the receiver comprising: a bit allocation table in accordance with which DMT symbols are decoded to data bits, the DMT symbols being received in superframes each including a synchronization symbol; and a control unit for detecting a change of an inversion state of successive synchronization symbols and changing the bit allocation table in response to such detection, successive changes of the bit allocation table being effected in response to detection of opposite changes of the inversion state of the synchronization symbols, respectively from non-inverted to inverted synchronization symbols and from inverted to non-inverted synchronization symbols.

According to a further aspect, the invention provides a method of effecting bit allocation changes in a DMT (discrete multitone) communications system in which information is transmitted from a transmitter to a receiver in superframes each of which comprises a plurality of DMT data symbols and a synchronization symbol, comprising the steps of: at the transmitter, in response to a request from the receiver for a change of bit allocations, sending to the receiver an acknowledgement identifying a superframe and, commencing with the identified superframe, changing an inversion state of the synchronization symbols, from non-inverted to inverted or from inverted to non-inverted, and implementing said bit allocation changes; and at the receiver, sending said request for a change in bit allocations, detecting the acknowledgement and identified superframe, and detecting the change in the inversion state of received synchronization symbols and implementing said bit allocation changes commencing with the identified superframe.

Conveniently this method comprises the steps of counting the superframes in synchronism at the transmitter and at the receiver, the acknowledgement identifying a superframe comprising a superframe number.

The invention also provides a transmitter for a DMT (discrete multitone) communications system for use in carrying out this method, comprising: a bit allocation table in accordance with which data bits are allocated to tones for transmission in respective DMT symbols; a control unit for controlling transmission of the DMT symbols in superframes each including a synchronization symbol, the control unit including means for sending said acknowledgement identifying a superframe in response to a request from the receiver for a change of bit allocations; and means for changing said bit allocation table and an inversion state of the synchronization symbols commencing with the identified superframe.

The invention further provides a receiver for a DMT (discrete multitone) communications system for use in carrying out this method, the receiver comprising: a bit allocation table in accordance with which DMT symbols are decoded to data bits, the DMT symbols being received in superframes each including a synchronization symbol; and a control unit for sending said request for a change in bit allocations, detecting the acknowledgement and identified superframe, and detecting the change in the inversion state of received synchronization symbols and changing said bit allocation table commencing with the identified superframe.

BRIEF DESCRIPTION OF THE DRAWINGS

The invention will be further understood from the following description with reference to the accompanying drawings, in which by way of example.

DETAILED DESCRIPTION

Figure 1:
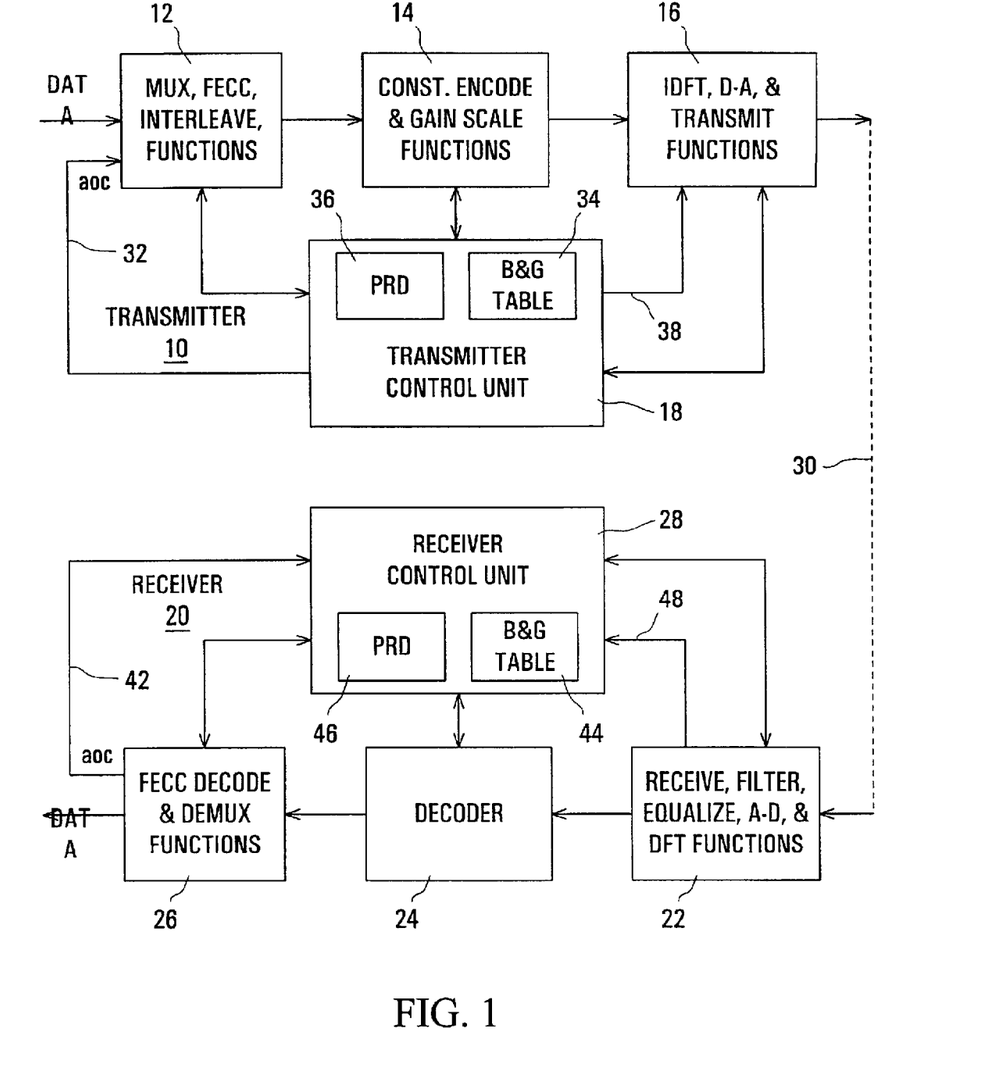
FIG. 1 illustrates a functional block diagram of a transmitter and a receiver of an ADSL communications system using DMT modulation.

Referring to the drawings, FIG. 1 illustrates functional blocks of a transmitter 10 and a receiver 20 of an ADSL communications system, which generally has the known form of a T1.413 ADSL system. As is known, the transmitter 10 comprises data multiplexing, CRC (cyclic redundancy check, scrambling and FECC (forward error correction coding), interleaving, and tone ordering functions represented by a unit 12; constellation encoding and gain scaling functions represented by a unit 14; IDFT (Inverse DFT), data buffering and parallel to serial conversion, D-A (digital to analog) conversion, and data transmission functions represented by a unit 16; and a transmitter control unit 18. The receiver 20 has converse functions, including receiving, filtering, equalization, A-D (analog to digital) conversion, data buffering and serial to parallel conversion, and DFT (Discrete Fourier Transform) functions represented by a unit 22; a decoder 24; data buffering and deinterleaving, FECC decoding, and data demultiplexing functions represented by a unit 26; and a receiver controller 28.

Signals transmitted from the transmitter 10 to the receiver 20 are carried via a path 30 between the units 16 and 22 represented by a dashed line in FIG. 1 and for example constituted by a two-wire telephone line. Although not shown in FIG. 1 for clarity, the ADSL system transmits signals in both directions on the path 30, and accordingly the system also includes similar transmit functions at the receiver 20 end of the path 30, and corresponding receiver functions at the transmitter 10 end of the path 30, in known manner.

The transmitter 10 and receiver 20 of the ADSL system of FIG. 1 operate in the generally known manner of a T1.413 ADSL system which need not be described here. Briefly, data to be transmitted by the transmitter 10, and the overhead control channel or aoc supplied by the transmitter control unit 18 on a line 32, are supplied to the unit 12, which for each data frame or DMT symbol provides a set of bits to the unit 14. The unit 14 allocates these bits to respective tones (multicarrier subchannels) and provides respective signal energies or transmit gains in accordance with a B&G (bits and gains) table 34 stored in the transmitter control unit 18, and the resulting encoded information is transmitted to the path 30 via the functions of the unit 16. After every 68 data frames or DMT symbols, the transmitter inserts a synchronization symbol (also referred to as a sync frame) which carries a pseudo random data (PRD) pattern supplied by a PRD source 36 in the transmitter control unit 18. Control paths are accordingly provided and illustrated in FIG. 1 between the transmitter control unit 18 and the units 12, 14, and 16. A further path 38 is also provided, from the transmitter control unit 18 to the unit 16 as shown in FIG. 1, as described further below.

Conversely, the signals received by the receiver 20 via the path 30 are processed by the unit 22 and decoded by the decoder 24 in accordance with a corresponding B&G table 44 stored in the receiver control unit 28, the decoded data being supplied to the unit 26 to provide received data and the aoc, the latter being supplied by the transmitter control unit 18 on a line 32, are supplied to the receiver control unit 28 via a line 42. The receiver control unit 28 also includes a corresponding PRD source 46 for use in recognizing each synchronization symbol. Control paths are provided and illustrated in FIG. 1 between the receiver control unit 28 and the units 22, 24, and 26. A further path 48 is also provided, from the unit 22 to the receiver control unit 28 as shown in FIG. 1, as described further below.

As described above, it is necessary to ensure that the B&G tables 34 and 44 in the transmitter 10 and the receiver 20 contain the same information, and to allow this information to be changed or updated to accommodate changes in SNR which occur over time, and/or for SRA, i.e. different numbers of data bits being allocated to different tones without interruption or disturbance of the data transmission. The aoc provides a communication path from the transmitter control unit 18 to the receiver control unit 28, and a corresponding aoc path is provided in the opposite direction of transmission by the corresponding units, not shown in FIG. 1, but mentioned above as being provided for the opposite direction of transmission. These aoc paths are used in a reliable manner (for example, using redundant transmissions of each message) for carrying information for updating the B&G tables.

However, as discussed above it remains necessary to provide a reliable notification of the changes in the B&G tables 34 and 44, so that changes in the encoding and decoding of the DMT symbols are always matched between the transmitter 10 and the receiver 20. Such notification is desired to be very resistant to errors due, for example, to noise bursts. Furthermore, in the event of such an error, it is desirable for the ADSL system to recover in the shortest possible time, without requiring retraining or re-initialization of the system. This last point is not particularly addressed by the various proposals discussed above. Further, it is desirable for these objectives to be met in a simple and convenient manner, without requiring any significant hardware changes or relatively complex processing of signals.

As described above, it has been proposed to invert the synchronization symbol to provide a notification of when the changed or updated B&G tables are to start being used, and, for robustness, for the receiver to monitor for inversion only the one synchronization symbol which it expects to be inverted in response to a request message that it has previously sent.

The present invention differs from this in that, rather than inverting one synchronization symbol to provide a notification, it inverts not only the current synchronization symbol but also each subsequent synchronization symbol. This inversion of all of the synchronization symbols continues until there is a subsequent change or update of the B&G tables, for the notification of which the inversion state of each of the current and subsequent synchronization symbols is again changed, so that these synchronization symbols are transmitted in their non-inverted form. This alternation of sequences of non-inverted and inverted synchronization symbols continues in a similar manner, with the inversion state of all of the subsequent synchronization symbols being changed to represent each notification of a switch to changed or updated B&G tables.

This seemingly simple change provides a radical improvement over the prior proposals discussed above. As in those proposals, it is conceivable that due to a burst of errors the inversion state of a synchronization symbol may be wrongly detected by the receiver. Consequently, if the receiver has previously sent a request message for an update of the B&G tables so that it is expecting a change in the inversion state of the synchronization symbol, and due to errors it either detects prematurely a change in the inversion state of a synchronization symbol, or fails to detect a change in the inversion state of a synchronization symbol, then this error condition will persist for only one superframe, because the receiver will detect the error from the inversion state of the next synchronization symbol. The probability of the inversion state of two successive synchronization symbols both being detected incorrectly is very small indeed, and even this error situation would be detected after another superframe. On the other hand, if the receiver detects a change in the inversion state of a synchronization symbol when it has not previously sent a request message for an update of the B&G tables so that no such change in inversion state is expected, it can immediately determine that an error has occurred.

Thus the receiver can quickly, i.e. typically after at most one superframe even when there has been an error in the detection of the inversion state of the synchronization symbol, detect and correct an error so that the correct B&G tables are always used. In this respect it can be seen that typically at most one superframe of data could be decoded in the receiver using the wrong B&G table, either prematurely updated or not updated when it should have been. A recovery from such an error situation can be carried out by reprocessing the superframe of data using the correct B&G table as soon as the error is detected, and/or in other known ways up to and including retransmission of the data. In any event, there is no resulting need for either a long recovery from the error condition or retraining or re-initialization of the ADSL system, so that the disadvantages associated with these processes are avoided.

From the above description it can be appreciated that a change in the inversion state of the synchronization symbols means either a change from non-inverted synchronization symbols to inverted synchronization symbols, or a change from inverted synchronization symbols to non-inverted synchronization symbols.

There are various ways in which the transmitter 10 can effect the inversion of each synchronization symbol which is to be inverted. For example, the transmitter control unit 18 can, as represented in FIG. 1 by the line 38, provide a signal to the unit 16 which produces an inversion of the sign of all of the inputs to the IDFT. Alternatively, such a signal supplied via the line 38 to the unit 16 can produce an inversion of the sign of the samples produced at the outputs of the IDFT. As a further alternative, the transmitter control unit 18 can selectively invert the output of the PRD source 36 which is used to provide data for the synchronization symbols. In the receiver 20, converse measures are taken to enable detection of the inversion state of each synchronization symbol, this information being supplied to the receiver control unit from the unit 22 via the line 48.

Figure 2:
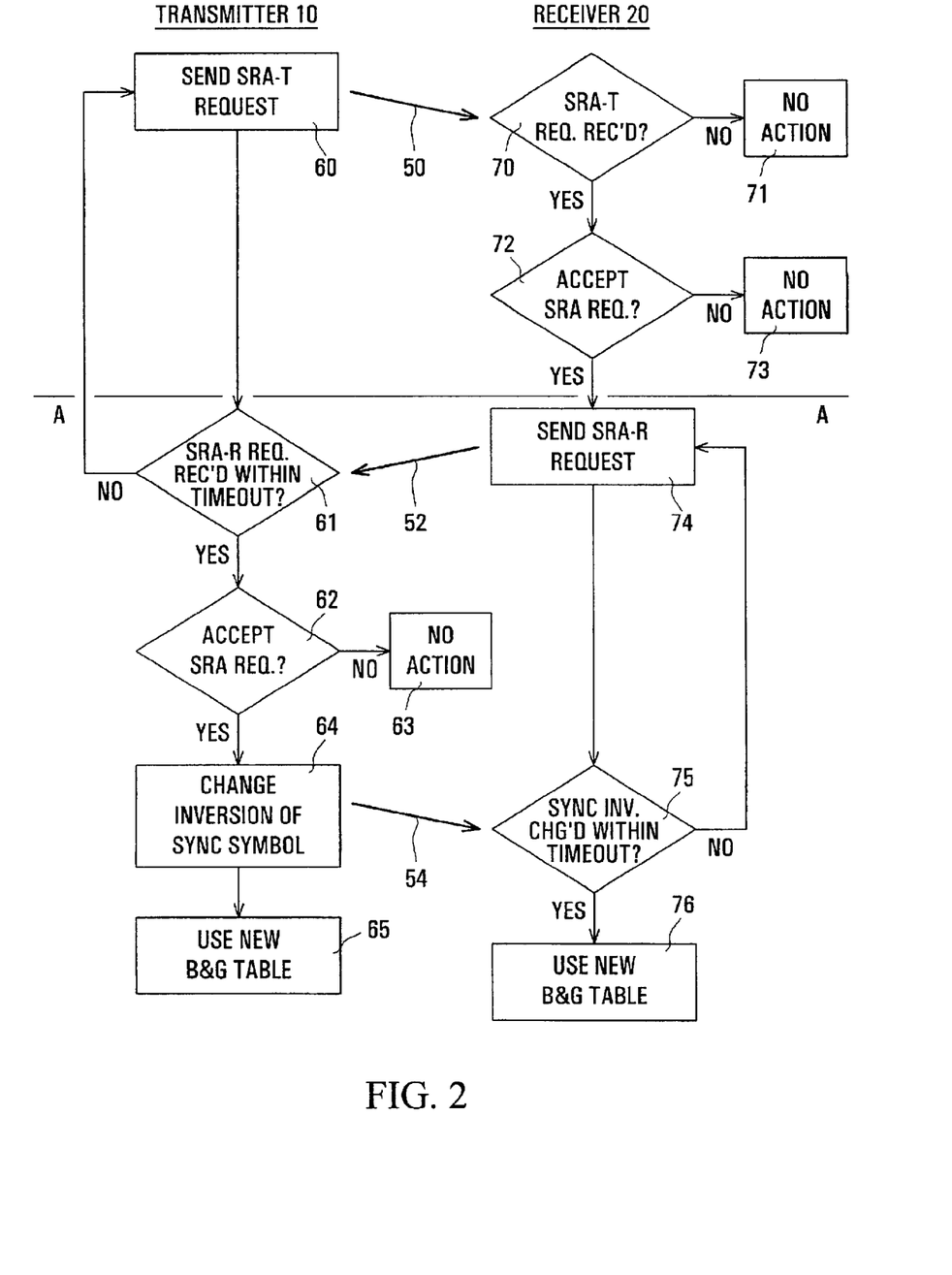
FIG. 2 is a flow chart with reference to which operations in the transmitter and receiver in accordance with one embodiment of the invention are described.

FIG. 2 is a flow chart which represents, in a simplified manner to facilitate illustration and understanding, steps carried out by the transmitter 10 and the receiver 20 in a notification process as described above. The left-hand side of FIG. 2 represents steps carried out at the transmitter 10, and the right-hand side of FIG. 2 represents steps carried out at the receiver 20. Bold arrowed lines 50 and 54 inclined downwardly to the right represent signals transmitted from the transmitter 10 to the receiver 20; a bold arrowed line 52 inclined downwardly to the left represents signal transmission from the receiver 20 to the transmitter 10, using the aoc in the opposite direction of transmission as described above.

FIG. 2 represents steps related to SRA initiated at the transmitter 10, and it is described below how this differs for SRA initiated at the receiver 20. It can be appreciated that similar steps are desirably carried out for a bit swap process initiated at the receiver 20 as is conventional, or for any other situation in which it may be desired to provide notification of a switch to changed or updated B&G tables.

Referring to FIG. 2, an SRA is initiated at the transmitter 10 as shown by a block 60 by the transmitter control unit 18 sending a request message SRA-T via the aoc, as shown by the line 50. As shown by a block 70, the receiver control unit 28 determines whether an SRA-T request message has been received via the aoc, if not takes no action as shown by a block 71, and if so determines at a block 72 whether or not to accept this request. If the receiver control unit 28 does not accept the SRA request, no further action is taken as indicated by a block 73. If the receiver control unit 28 accepts the SRA request, at a block 74 it transmits, via the aoc in the opposite direction as indicated by the line 52, a request message SRA-R. In the transmitter 10, after sending the SRA-T request message at the block 60 (and with an appropriate waiting period which is not separately shown in FIG. 2) the transmitter control unit 18 determines at a block 61 whether an SRA-R request message has been received within a timeout period; if not it can return to the block 60 to retransmit the SRA-T message.

For SRA initiation at the receiver 20, the steps 70 to 73 at the receiver 20 are omitted, the SRA initiation starting with the receiver control unit 28 sending the SRA-R request message at the block 74. Correspondingly, at the transmitter 10 the step 60 is omitted, the transmitter control unit 18 simply determining at the block 61 whether or not a request message SRA-R has been received from the receiver 20. If not, in this case no action is taken at the transmitter 10. Accordingly, for SRA initiation at the receiver 20 the steps omit the blocks shown above a horizontal line A—A in FIG. 2.

In response to a request message SRA-R received at the block 61, the transmitter control unit 18 determines at a block 62 whether or not to accept this request. If the transmitter control unit 18 does not accept the SRA request, no further action is taken as indicated by a block 63. If the transmitter control unit 18 accepts the SRA request, it subsequently at a block 64 changes the inversion state of the synchronization symbols that it transmits, as described above. Thus if each synchronization symbol has previously been transmitted in non-inverted form, then the transmitter starts to transmit the successive synchronization symbols in inverted form, and if each synchronization symbol has previously been transmitted in inverted form, then the transmitter starts to transmit the successive synchronization symbols in non-inverted form. As shown by a block 65, with this change in inversion state of the synchronization symbols the transmitter control unit starts to use the new or updated B&G table 34 for the operation of the unit 14.

Having sent the request message SRA-R at the block 74, the receiver control unit 28 expects a change in the inversion state of the synchronization symbols, which it determines at a block 75 (with an appropriate waiting period which is not separately shown in FIG. 2). In the absence of such a change in the inversion state of the synchronization symbols being detected within a timeout period, the receiver can conclude that an error has occurred and can return to the block 74 to retransmit the SRA-R request message. On detection of the expected change in the inversion state of the synchronization symbols, as shown by a block 76 the receiver control unit 28 starts to use the new or updated B&G table 44 for the operation of the decoder 24. In the event of a detected error, the receiver control unit 28 can initiate rapid recovery measures for example as outlined above.

Figure 3:
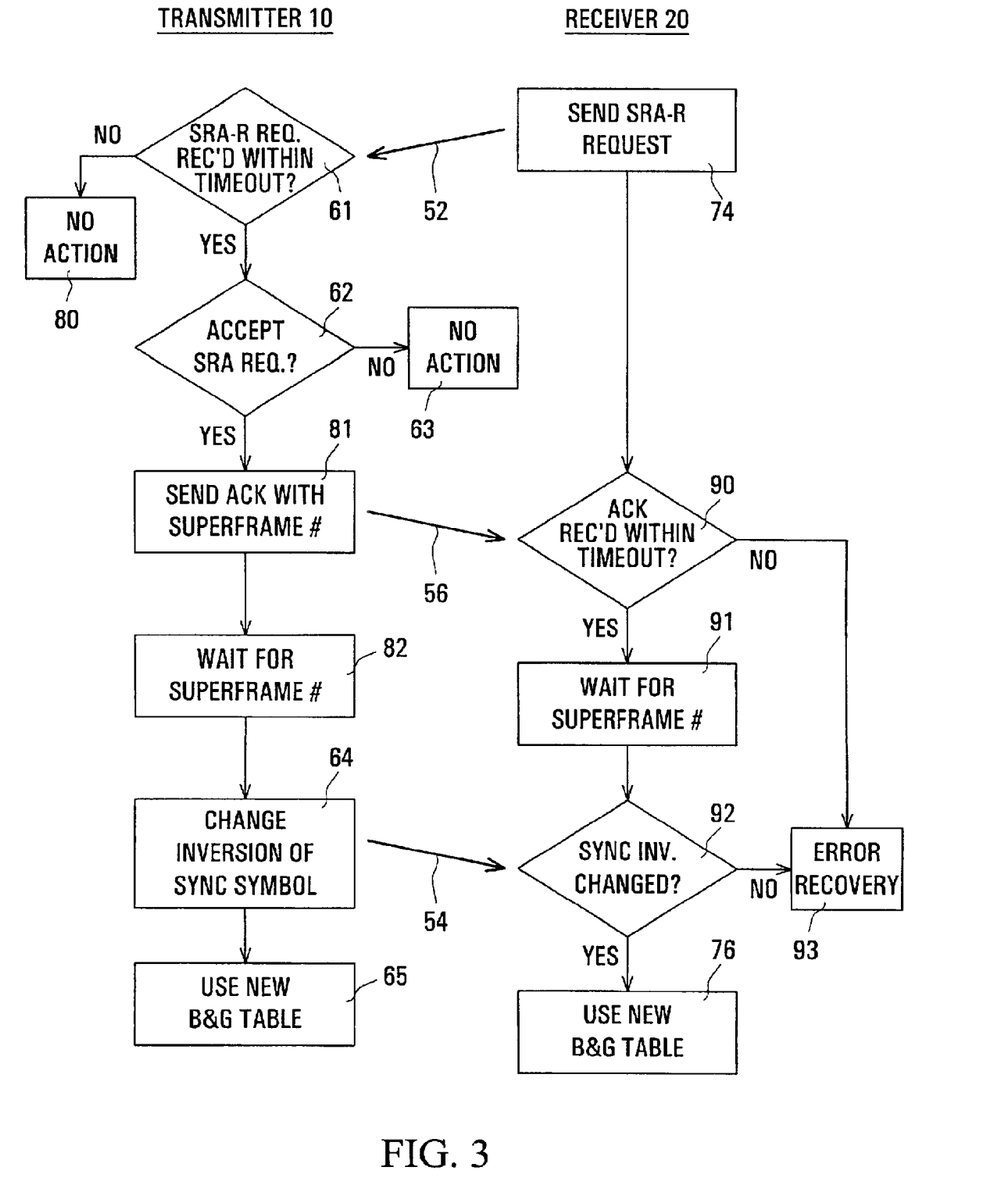
FIG. 3 is a flow chart illustrating operations in the transmitter and receiver in accordance with another embodiment of the invention.

FIG. 3 is a flow chart which represents, in a simplified manner similar manner to FIG. 2 and using the same references where appropriate, steps carried out by the transmitter 10 and the receiver 20 in a notification process in accordance with another embodiment of the invention, in this case initiated at the receiver 20 with the receiver control unit 28 sending the SRA-R request message at the block 74. At the transmitter 10, the transmitter control unit 18 determines at the block 61 whether or not a request message SRA-R has been received from the receiver 20. If not, no action is taken at the transmitter 10, as shown by a block 80. The transmitter control unit 18 again determines at the block 62 whether or not to accept the SRA request, and accordingly either takes no further action as indicated by the block 63 or proceeds to a block 81.

In the latter case, as shown in FIG. 3 by the block 81 the transmitter control unit 18 determines a number of a future superframe for which it will introduce a change in the inversion state of the synchronization symbols, and sends to the receiver control unit 28, via the aoc as indicated by a line 56, an acknowledgement (ACK) of the received and accepted SRA-R request message with this superframe number. To this end, the superframes are counted in synchronism at the transmitter 10 and the receiver 20, as is already known in the art and may be carried out for other purposes. The transmitter control unit 18 then waits, as indicated by a block 82, for this superframe number, and for this and subsequent superframes changes the inversion state of the synchronization symbols and uses the new B&G table, as represented in FIG. 3 by the blocks 64 and 65 and as already described above.

In the receiver 20, at a block 90 (with an appropriate waiting period which is not separately shown in FIG. 3) the receiver control unit 28 detects the acknowledgement of its SRA-R request message with the superframe number determined at the transmitter 10, and at a block 91 waits for the occurrence of this numbered superframe. It then, at a block 92, checks for the expected change in the inversion state of the synchronization symbol, and as shown by the block 76 then starts to use the new or updated B&G table 44 for the operation of the decoder 24. If the acknowledgement is not received at the block 90 within a timeout period, or if the expected change in the inversion state of the synchronization symbol of the numbered superframe is not detected at the block 92, the receiver control unit 28 concludes that an error has occurred and proceeds to an error recovery process represented by a block 93. The error recovery process can include steps for example as described above for rapid recovery from the detected error.

Although particular embodiments of the invention are described in detail above, it can be appreciated that numerous modifications, variations, and adaptations may be made within the scope of the invention as defined in the claims.

What is claimed is:

1. A method of notifying a receiver of a bit allocation change in a multicarrier modulation communications system in which data frames and synchronization frames are transmitted in superframes from a transmitter to the receiver, comprising the steps of:

at the transmitter, changing an inversion state of successive synchronization frames to notify the receiver of a bit allocation change; and at the receiver, detecting a change in inversion state of received synchronization frames to determine the bit allocation change.

2. A transmitter for a multicarrier modulation communications system for use in carrying out the method of claim 1, the transmitter comprising:

information for allocating data bits to multicarrier subchannels for transmission in respective data frames;

a control unit for controlling transmission of the data frames in superframes each including a synchronization frame; and means for changing an inversion state of the synchronization frames to indicate a change of said information, successive changes of said information being indicated by opposite changes of the inversion state of the synchronization frames, respectively from non-inverted to inverted synchronization frames and from inverted to non-inverted synchronization frames.

3. A receiver for a multicarrier modulation communications system for use in carrying out the method of claim 1, the receiver comprising:

information for decoding received multicarrier subchannel data frames to data bits in accordance with bit allocations, the data frames being received in superframes each including a synchronization frame; and a control unit for detecting a change of an inversion state of successive synchronization frames and changing said bit allocations in response to such detection, successive changes of said bit allocations being effected in response to detection of opposite changes of the inversion state of the synchronization frames, respectively from non-inverted to inverted synchronization frames and from inverted to non-inverted synchronization frames.

4. A method of notifying a receiver of bit allocation changes in a DMT (discrete multitone) communications system in which information is transmitted from a transmitter to the receiver in superframes each of which comprises a plurality of DMT data symbols and a synchronization symbol, comprising the steps of:

at the transmitter, changing an inversion state of synchronization symbols in successive superframes, from non-inverted to inverted and from inverted to non-inverted, to notify the receiver of successive bit allocation changes; and at the receiver, detecting changes in the inversion state of received synchronization symbols in successive superframes, from non-inverted to inverted and from inverted to non-inverted, to determine the successive bit allocation changes.

5. A transmitter for a DMT (discrete multitone) communications system for use in carrying out the method of claim 4, the transmitter comprising:

a bit allocation table in accordance with which data bits are allocated to tones for transmission in respective DMT symbols;

a control unit for controlling transmission of the DMT symbols in superframes each including a synchronization symbol; and means for changing an inversion state of the synchronization symbols to indicate a change of the bit allocation table, successive changes of the bit allocation table being indicated by opposite changes of the inversion state of the synchronization symbols, respectively from non-inverted to inverted synchronization symbols and from inverted to non-inverted synchronization symbols.

6. A transmitter as claimed in claim 5 wherein the transmitter includes an IDFT (Inverse Discrete Fourier Transform) and the means for changing an inversion state of the synchronization symbols to indicate a change of the bit allocation table comprises means for changing a sign of inputs to or outputs from the IDFT.

7. A transmitter as claimed in claim 5 wherein the transmitter includes a pseudo random data source in accordance with which tones of the synchronization symbols are modulated, and the means for changing an inversion state of the synchronization symbols to indicate a change of the bit allocation table comprises means for selectively inverting an output of the pseudo random data source.

8. A receiver for a DMT (discrete multitone) communications system for use in carrying out the method of claim 4, the receiver comprising:

a bit allocation table in accordance with which DMT symbols are decoded to data bits, the DMT symbols being received in superframes each including a synchronization symbol; and a control unit for detecting a change of an inversion state of successive synchronization symbols and changing the bit allocation table in response to such detection, successive changes of the bit allocation table being effected in response to detection of opposite changes of the inversion state of the synchronization symbols, respectively from non-inverted to inverted synchronization symbols and from inverted to non-inverted synchronization symbols.

9. A method of effecting bit allocation changes in a DMT (discrete multitone) communications system in which information is transmitted from a transmitter to a receiver in superframes each of which comprises a plurality of DMT data symbols and a synchronization symbol, comprising the steps of:

at the transmitter, in response to a request from the receiver for a change of bit allocations, sending to the receiver an acknowledgement identifying a superframe and, commencing with the identified superframe, changing an inversion state of synchronization symbols in successive superframes, from non-inverted to inverted or from inverted to non- inverted, and implementing said bit allocation changes; and at the receiver, sending said request for a change in bit allocations, detecting the acknowledgement and identified superframe, and detecting the change in the inversion state of received synchronization symbols in successive superframes and implementing said bit allocation changes commencing with the identified superframe.

10. A method as claimed in claim 9 and comprising the steps of counting the superframes in synchronism at the transmitter and at the receiver, wherein the acknowledgement identifying a superframe comprises a superframe number.

11. A transmitter for a DMT (discrete multitone) communications system for use in carrying out the method of claim 10, the transmitter comprising:

a bit allocation table in accordance with which data bits are allocated to tones for transmission in respective DMT symbols;

a control unit for controlling transmission of the DMT symbols in superframes each including a synchronization symbol, the control unit including means for sending said acknowledgement identifying a superframe in response to a request from the receiver for a change of bit allocations; and means for changing said bit allocation table and an inversion state of the synchronization symbols commencing with the identified superframe.

12. A transmitter as claimed in claim 11 wherein the transmitter includes an IDFT (Inverse Discrete Fourier Transform) and the means for changing an inversion state of the synchronization symbols comprises means for changing a sign of inputs to or outputs from the IDFT.

13. A transmitter as claimed in claim 11 wherein the transmitter includes a pseudo random data source in accordance with which tones of the synchronization symbols are modulated, and the means for changing an inversion state of the synchronization symbols comprises means for selectively inverting an output of the pseudo random data source.

14. A receiver for a DMT (discrete multitone) communications system for use in carrying out the method of claim 10, the receiver comprising:

a bit allocation table in accordance with which DMT symbols are decoded to data bits, the DMT symbols being received in superframes each including a synchronization symbol; and a control unit for sending said request for a change in bit allocations, detecting the acknowledgement and identified superframe, and detecting the change in the inversion state of received synchronization symbols and changing said bit allocation table commencing with the identified superframe.

* * * * *